(12) United States Patent
Serra-Garrido

(10) Patent No.: US 9,277,731 B2
(45) Date of Patent: Mar. 8, 2016

(54) MANUAL BRUSHING DEVICE FOR ANIMALS, HORSES IN PARTICULAR

(76) Inventor: Ada Noris Serra-Garrido, Boxtel (NL)

( * ) Notice: Subject to any disclaimer, the term of this patent is extended or adjusted under 35 U.S.C. 154(b) by 1 day.

(21) Appl. No.: 14/131,175

(22) PCT Filed: Jun. 29, 2012

(86) PCT No.: PCT/NL2012/050466
§ 371 (c)(1),
(2), (4) Date: Jan. 6, 2014

(87) PCT Pub. No.: WO2013/006047
PCT Pub. Date: Jan. 10, 2013

(65) Prior Publication Data
US 2014/0289978 A1    Oct. 2, 2014

(30) Foreign Application Priority Data
Jul. 6, 2011  (NL) ...................................... 2007055

(51) Int. Cl.
*A01K 13/00*    (2006.01)
(52) U.S. Cl.
CPC .................................... *A01K 13/002* (2013.01)
(58) Field of Classification Search
CPC .................................................... A01K 13/002
See application file for complete search history.

(56) References Cited

U.S. PATENT DOCUMENTS

| 1,743,898 | A |   | 1/1930  | McCauley |
|-----------|---|---|---------|----------|
| 2,753,583 | A | * | 7/1956  | Jepson ............................ 15/246 |
| 5,211,131 | A | * | 5/1993  | Plyler ............................ 119/606 |
| 5,297,512 | A | * | 3/1994  | Sharp ............................ 119/602 |
| 8,060,967 | B1 | * | 11/2011 | Johnson, Jr. ...................... 15/23 |
| 8,132,541 | B1 | * | 3/2012  | Baer, Jr. ........................ 119/664 |
| 8,857,011 | B2 | * | 10/2014 | Casper ............................ 15/344 |

FOREIGN PATENT DOCUMENTS

DE    843622    7/1952
EP    0600805   6/1994

* cited by examiner

*Primary Examiner* — Kristen C Hayes
(74) *Attorney, Agent, or Firm* — Eric Karich; Karich & Associates

(57) ABSTRACT

A manual brushing device has a handle which comprises a battery, as well as a rotatable driving part that is connected to the handle for driving the connected removable brush. This driving part comprises an electric motor for the rotation of the brush, as well as vibration devices, which can cause the brush to tap or vibrate, causing the better removal of the dirt and dust from the skin. The brush has a removable receiving cover locked onto the driving part.

10 Claims, 2 Drawing Sheets

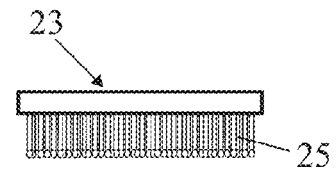
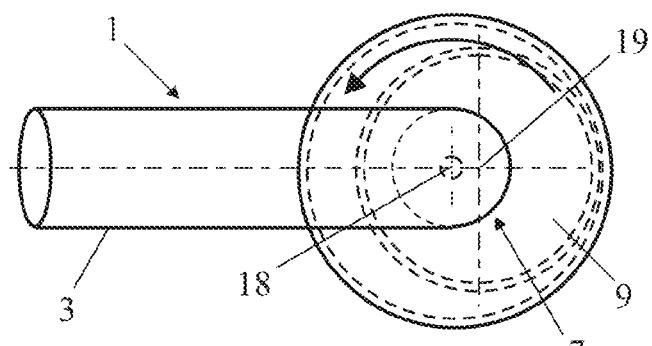
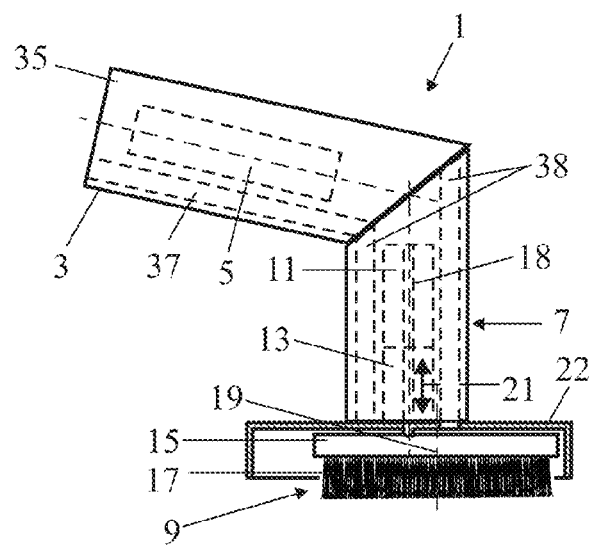

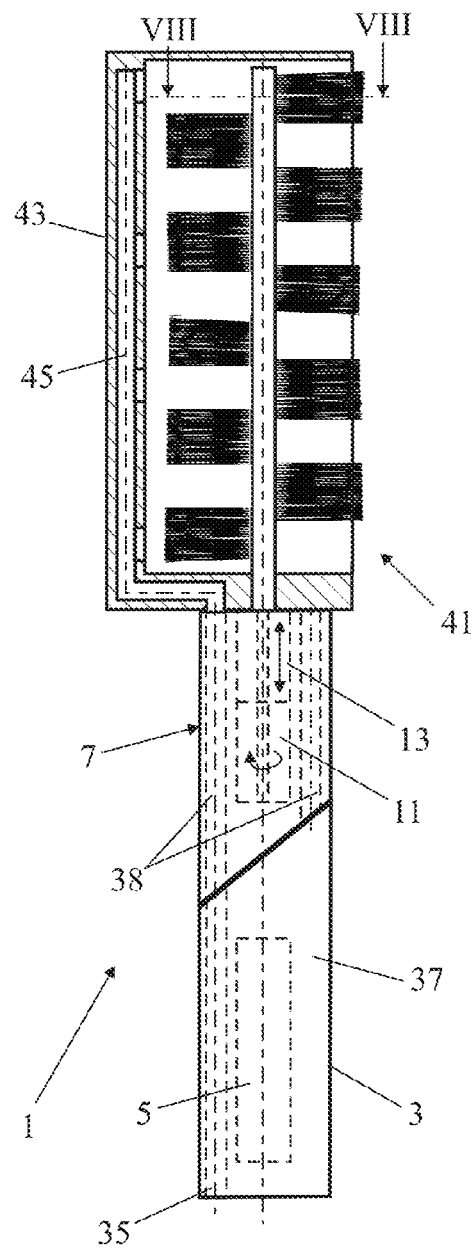
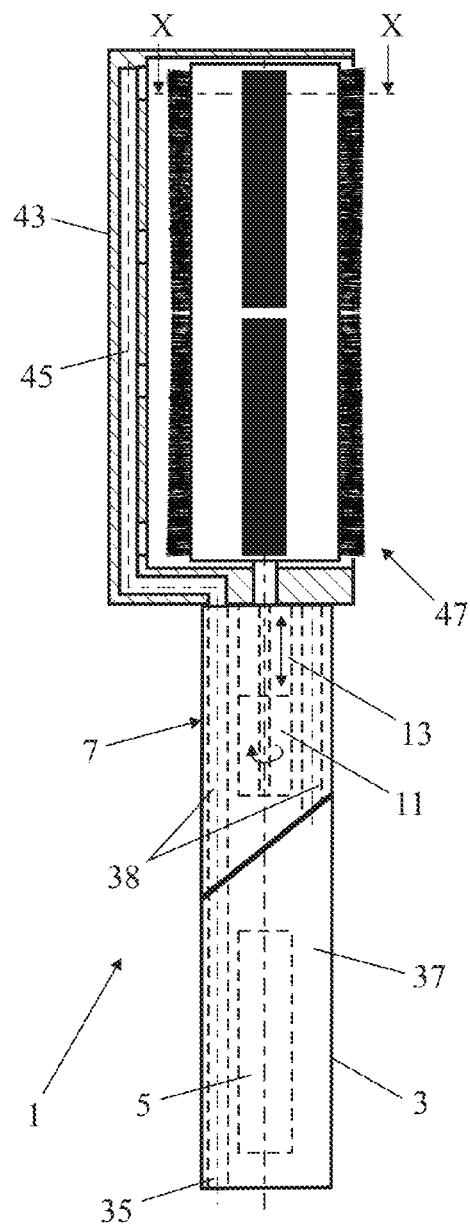
FIG. 7　　　　　　FIG. 9
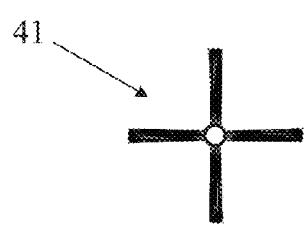
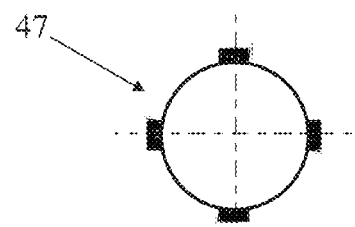
FIG. 8　　　　　　FIG. 10

MANUAL BRUSHING DEVICE FOR ANIMALS, HORSES IN PARTICULAR

BACKGROUND OF THE INVENTION

1. Field of the Invention

The invention relates to a manual brushing device for animals and in particular for horses, comprising a handle and a driving part which in turn includes an electric motor with an outgoing driving axle, as well as a brush that is connected to the driving axle. Horses must be taken care of regularly in order to keep the horse's skin clean and healthy. This is achieved by regularly brushing the horse's skin, whereby different brushes are used during the course of a brushing session. First a rubber brush is used for massaging the skin to release dirt and dead hairs. The brush is used in a circular motion. Then a stiff brush must be used to remove the dead hairs, dirt and dust. After which a soft brush is used for the removal of remaining hairs, dirt and dust. The blood circulation in the skin is stimulated during brushing, which keeps the skin healthy.

2. Prior Art

Such a manual brushing device is known from patent application JP-A-59135824. In this known manual brushing device the brush is formed by an axle with radial protruding brush hairs, whereby the axis of the brush is parallel to the driving axle of the electric motor. The driving part of this known manual brushing device is located in the handle. This known manual brushing device is suitable for removing dead hairs and dirt from the animal's skin, but does not stimulate the animal's blood circulation.

SUMMARY OF THE INVENTION

An objective of the invention is to provide a manual brushing device of the type described in the preamble with which the horses can be cleaned better and easier. To this end the manual brushing device according to the invention is characterized in that the manual brushing device comprises a receiving cover, which is removable and is connected to the handle. This cover collects dirt and dust from the horse during brushing, so that the cleaning effect of brushing will improve. Without this cover the dust will for a part fall back onto the horse.

An embodiment of the manual brushing device according to the invention is characterized in that the manual brushing device also comprises vibration aids that enable the brush's vibration. By pressing the brush against the horse's skin whilst the vibration aids are operational, the horse's skin is cleaned more thoroughly than if it would be cleaned by a circular motion of a brush. In addition, the skin is given a better massage which stimulates the blood circulation in the skin and keeps the skin healthy. The manual brushing device according to the invention makes it possible to brush a horse faster, with less effort than would be required for brushing manually, while the result in respect of cleanliness and health of the skin is better.

The vibrating movement is a vibrating or oscillating movement, preferably in the direction of the driving axle. The manual brushing device can be adjusted so that the vibrating movement can take place independently from the rotating movement. However, the preference is to always operate the manual brushing device to enable the vibrating movement of the brush at the same time as its rotating movement.

A further embodiment of the manual brushing device according to the invention is characterized in that the handle is adjustable in respect of the driving part, whereby the handle can be placed perpendicular in respect of the driving axle in one position or can be placed parallel to the driving axle in another position. For the removal of dead hairs and dust, a cylindrical brush is best used that is located parallel to the driving axle and whereby the handle is also located parallel to the driving axle. For the loosening of the dead hairs, dirt and dust, a flat brush is best used that is located perpendicular to the driving axle and whereby the handle is situated at a perpendicular angle to the driving axle to enable the easy and firm brushing against the horse's skin.

A further embodiment of the manual brushing device according to the invention is characterized in that the manual brushing device comprises a connection to extraction devices and/or a water hose, the connection of which is linked through a duct to an opening of the receiving cover. This enables the dirt that is loosened by brushing to be extracted and the horse to be washed. The brush elements could be hairs, pins, studs etc.

A further embodiment of the manual brushing device according to the invention is characterized in that the manual brushing device comprises extraction and/or blowing devices that are connected through a duct to an opening in the receiving cover. The extraction and/or blowing devices are for example formed by a blade wheel driven by an electric motor already present or an additional electric motor.

A further embodiment of the manual brushing device according to the invention is characterized in that the manual brushing device comprises a means to collect dirt and hairs, which are present in the receiving cover. If the manual brushing device does not have extraction devices or a connection thereto, it is advisable to retain the dirt, dust and hairs, to ensure they do not land on the horse.

A further embodiment of the manual brushing device according to the invention is characterized in that the manual brushing device is connected off-centre to the driving axle. This enables the centre of the brush to make a circular movement while the brush is turning on its axis. This results in a better brushing motion than would be achieved if the brush would merely be rotated on its axis.

BRIEF DESCRIPTION OF THE DRAWINGS

The invention will be elucidated more fully below on the basis of drawings in which an embodiment of the manual brushing device according to the invention is shown. In these drawings:

FIG. 1 shows an embodiment of the manual brushing device from above;

FIG. 2 shows the manual brushing device from the side;

FIGS. 3, 4 and 5 show other brushes of the manual brushing device;

FIG. 6 shows a horse with the manual brushing device held against it during the cleaning of the skin; and FIG. 7 shows the manual brushing device with the handle and the driving part in a different position in respect of each other and with a long brush;

FIG. 8 shows a cross-section of the brush of the manual brushing device shown in FIG. 7;

FIG. 9 shows the manual brushing device with the handle and the driving part in the position shown in FIG. 7 with a different long brush; and FIG. 10 shows a cross-section of the brush of the manual brushing device shown in FIG. 9.

DETAILED DESCRIPTION OF THE DRAWINGS

The FIGS. 1 and 2 show an embodiment of the manual brushing device according to the invention from the top and from the side. The manual brushing device 1 has a handle 3 which comprises a battery 5, as well as a rotatably driving part 7 that is connected to the handle for driving a connected removable brush 9. This driving part 7 contains an electric motor 11 for the purpose of rotating the brush, as well as vibration devices 13 for the vibration of the brush 9.

The brush 9 has a flat base plate 15 to which brush elements 17 are attached. The base plate 15 has an off-centre connection to the driving axle 18 of the electric motor 11, enabling it to rotate on its axis 19 perpendicular to the base plate, but also to move in a circular motion.

The oscillation devices 13 are formed by an electrical coil that has been attached to the casing of the oscillation devices which contains a core that has resilient movement in the coil, the end of which presses against an internal stop. The oscillation devices cause the base plate to make backward and forward movements 21 perpendicular to the base plate 15 and operate during the rotation of the brush 9.

The manual brushing device 1 has been designed for manual use and can be used with a battery or can be plugged in the external voltage supply. The brush elements 17 of the brush attached to the holder plate are formed by brush hairs. The brush 9 can be exchanged by one of the other brushes. In FIGS. 3, 4 and 5 the other brushes 23, 27 and 31 of the manual brushing device are shown with brush pins 25, brush studs 29 and a pad 33 respectively.

The manual brushing device 1 also has a connection 35 for extraction devices, for example the hose of a vacuum cleaner. This connection 35 is connected through a duct 37 in the handle 3 and a further duct 38 in the driving part 7 to an opening in a removable receiving cover 22 which is present at the back and sides of the brush 9. It is also possible to use a water hose to connect to connection 35, instead of a vacuum cleaner. The manual brush holder itself can also be fitted with extraction and/or blowing devices connected to duct 37. In that case a dust bag can be attached to connection 35.

By way of illustration, FIG. 6 shows a horse 39 with the manual brushing device 1 according to the invention held against it, whilst the horse's skin is being cleaned. The person holding the manual brushing device is not shown.

The angle with which the handle 3 is positioned in respect of the driving part 7 and therefore in respect of the brush 9 is adjustable. The manual brushing device 1 is shown in FIG. 7, whereby the handle 3 is in line with the driving part 4 and is fitted with a different type of brush 41. A further removable receiving cover 43 is locked onto the driving part. The brush 41 brushes the dirt and the dust from the skin into the cover. The dirt and dust present is sucked into duct 45 in the cover. FIG. 8 shows a cross-section of the brush 41.

FIG. 9 shows the manual brushing device 1 whereby the handle and the driving part are in line, however, this time with a different type of long brush 47. The hairs of this brush are stiff, for example made of metal. The free ends of the hairs are bent into hooks (not visible in the figure) for the removal of old hairs during moulting. FIG. 10 shows a cross-section of the brush 49.

Although in the above the invention is explained on the basis of the drawings, it should be noted that the invention is in no way limited to the embodiment shown in the drawings. The invention also extends to all embodiments deviating from the embodiment shown in the drawings within the context defined by the claims.

What is claimed is:

1. Manual brushing device, comprising:
   a handle;
   a driving part comprising:
      an electric motor having an outgoing driving axle;
      a brush that is connected to the driving axle such that the electric motor when activated rotates the brush; and
   a vibration means for vibrating the brush.

2. Manual brushing device according to claim 1, further comprising a receiving cover, which is removable and is connected to the handle.

3. Manual brushing device according to claim 1, wherein the handle is adjustable in respect of the driving part, whereby the handle can be placed perpendicular to the driving axle and can, in a different position, be placed parallel to the driving axle.

4. Manual brushing device according to claim 1, wherein the manual brushing device comprises a connection for extraction devices and/or a water hose, which is connected through a duct to an opening of the receiving cover.

5. Manual brushing device according to claim 1, wherein the manual brushing device comprises extraction and/or blowing devices that are connected through a duct to an opening in the receiving cover.

6. Manual brushing device according to claim 1, wherein the brush is connected to the driving axle in an off-centre position.

7. Manual brushing device according to claim 1, wherein the vibration means are such that they oscillate the brush in the direction of the driving axle.

8. Manual brushing device according to claim 1, further comprising adjusting means for independently adjusting the vibrating movement and the rotating movement.

9. A manual brushing device, comprising:
   a handle;
   a driving part mounted in the handle and comprising an electric motor having an outgoing driving axle;
   a brush that is connected to the driving axle such that the electric motor when activated rotates the brush; and
   a vibration means operably mounted in the handle for vibrating the brush.

10. A manual brushing device, comprising:
    a handle;
    an electric motor operably mounted in the handle for rotating an outgoing driving axle having an axis;
    a brush having a base plate having brush elements extending therefrom, the base plate being connected to the driving axle such that the electric motor when activated rotates the base plate; and
    a vibration means operably mounted in the handle for vibrating the brush via the base plate, such that the vibration mean induces oscillation of the base plate of the brush parallel to the axis of the driving axle.

\* \* \* \* \*